April 11, 1961 R. F. WICK 2,979,006
SIGNAL TRANSLATING SYSTEM
Filed Jan. 4, 1944

INVENTOR
R.F. WICK
BY
Walter C. Kiesel
ATTORNEY

United States Patent Office 2,979,006
Patented Apr. 11, 1961

2,979,006

SIGNAL TRANSLATING SYSTEM

Ronald F. Wick, New Providence, N.J., assignor to Bell Telephone Laboratories, Incorporated, New York, N.Y., a corporation of New York Filed Jan. 4, 1944, Ser. No. 516,927

6 Claims. (Cl. 114—23)

This invention relates to signal translating systems and more particularly to signal-controlled steering systems for torpedoes and other moving bodies, such as disclosed in the application Serial No. 499,139, now abandoned, filed August 18, 1943, of Ronald F. Wick, wherein the steering rudder or elevator is controlled in accordance with the phase difference between target signals received by a pair of signal detectors, such as hydrophones or microphones, mounted upon the torpedo or body, to guide the torpedo or body to the target.

One object of this invention is to simplify and to facilitate the construction of signal-controlled steering systems for moving bodies and particularly of such systems operable in accordance with the difference in phase between signals received at a pair of detectors carried by the moving body.

Another object of this invention is to increase the sensitivity, that is the response with respect to off course direction angle, of signal phase difference responsive steering control systems for torpedoes.

A further and specific object of this invention is to reduce the stringency of design requirements, notably matching of the several signal channels, in a steering control system of the phase difference type.

In one illustrative embodiment of this invention, a target signal controlled steering system for a torpedo comprises a pair of hydrophones mounted on the torpedo in such relation that, for the intended operating frequency band of the system, an appreciable phase difference obtains between target signals received at the two hydrophones, a resolving circuit associated with the hydrophones and effective to convert the hydrophone outputs in combination into a control signal related in polarity and magnitude to the angular relation of the target with respect to the torpedo, and an actuating element for deflecting the rudder, or elevator, of the torpedo in accordance with the control signal.

In accordance with one feature of this invention, the resolving circuit comprises one or more linear phase delay networks associated with the hydrophones to derive two delayed voltages, corresponding to the hydrophone outputs, and means are provided for combining these voltages with undelayed voltages corresponding to the hydrophone outputs in such manner as to produce a control voltage related in polarity and magnitude to the target signal phase differential extant between the two hydrophones.

The invention and the above-noted and other features thereof will be understood more clearly and fully from the following detailed description with reference to the accompanying drawing, in which.

Figure 1:
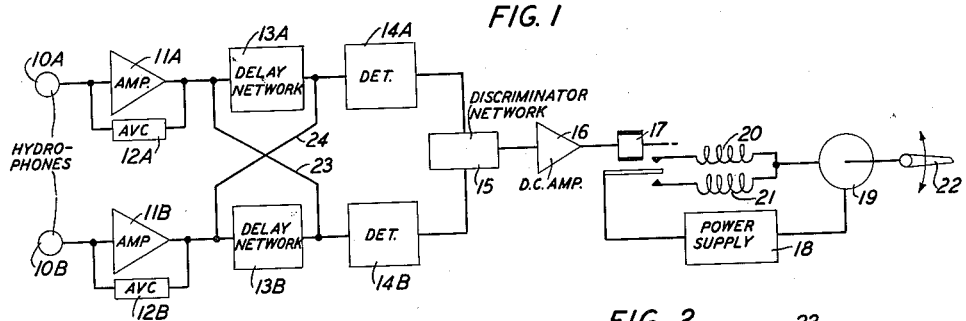
Fig. 1 is a diagram of a torpedo steering system illustrative of one embodiment of this invention.

Referring now to the drawing, the system illustrated in Fig. 1 comprises a pair of substantially identical, non-directional hydrophones 10A and 10B which are mounted upon the torpedo, for example on the head thereof as disclosed in the aforementioned application, and spaced a distance comparable to, advantageously greater than, a quarter wavelength of the mean frequency in the band of frequencies to which the system is designed to be responsive. The hydrophones constitute the input elements of two substantially identical channels, each of which comprises an amplifier 11 provided with automatic volume control 12, a linear phase delay network 13 and a detector or rectifier 14, the elements of each channel being identified in the drawing by the appropriate numeral and the reference letter, A or B, of the associated hydrophone. The outputs of the detectors or rectifiers 14 are combined in difference relation in a discriminator network 15, which may be of the construction disclosed in detail in the above-identified application, to produce a control signal which is supplied to a direct current amplifier 16. The amplifier controls a relay 17 in accordance with the polarity of the control signal, the contacts of which relay are included in a circuit including a power supply source 18, a reversible motor 19 and one or the other of the halves 20 and 21 of the field winding of the motor. The direction of rotation of the motor is determined by which of the windings 20 or 21 is energized. The motor 19 is coupled to the rudder, or elevator, 22 of the torpedo.

As indicated in Fig. 1, the output side of the amplifier 11A is connected to the output side of the delay network 13B by a cross-connection 23 and the amplifier 11B and delay network 13A are connected similarly by a cross-connection 24 so that the voltage supplied to each of the detectors or rectifiers 14 is the resultant of the output voltage, not delayed, of one hydrophone and the output voltage, delayed, of the other hydrophone. Particularly advantageously the hydrophones 10 are so poled that the voltage supplied to each rectifier is the difference of the two voltages, delayed and undelayed, noted. As pointed out above, the two rectified voltages are combined in difference relation in the discriminator network 15. The resultant signal is related in polarity and amplitude to the sense and magnitude of the phase difference between the target signals detected at the two hydrophones, as will be seen from the following consideration with reference to Fig. 3.

For purposes of discussion, the output voltage of amplifier 11A may be designated as A and this voltage as delayed by the network 13A may be designated as A'. Similarly, the undelayed and delayed voltages obtained from the amplifier 11B and network 13B may be designated as B and B' respectively. For simplicity of illustration, it is assumed that the delay networks 13 have negligible attenuation, a condition which may be realized for practical purposes in actual constructions as pointed out hereinafter, and that the output voltages of the amplifiers 11 also are equal. Such equality of amplifier voltages is not essential in so far as correctness of the polarity of the control signal produced is concerned although substantial equality is required for optimum performance of the steering system and can be realized readily in actual construction.

Figure 3A:
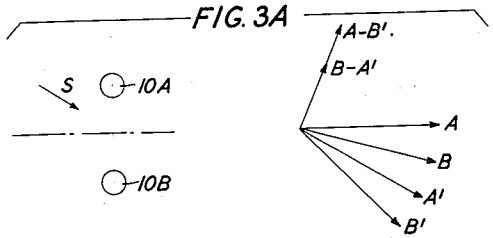
Figs. 3A, 3B and 3C are vector diagrams illustrating the principles and operation of the resolving networks included in the system shown in Fig. 1.
Figure 3B:
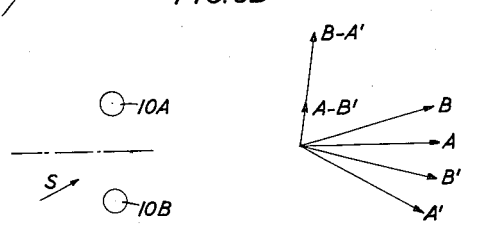
Figure 3C:
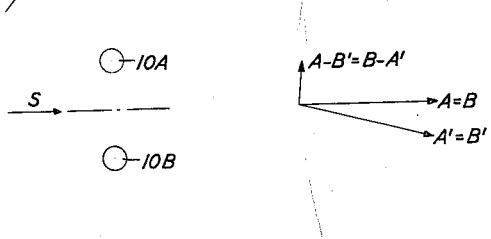

For the conditions assumed, the two undelayed and two delayed voltages involved are all of equal magnitude and may be represented by vectors of equal length as indicated in Figs. 3A, 3B and 3C. If the target is at such position relative to the torpedo that the target signal direction is as indicated by the arrow S in Fig. 3A, the output voltage of the hydrophone 10B will lag behind that of the hydrophone 10A and the relation of the voltages A and B will be as indicated in this figure. Inasmuch as, as pointed out above, the networks 13 are identical and the phase lag thereof is linear with frequency, a constant time lag is introduced by these networks between A and A' and B and B', the two lags being equal. The relative positions of the vectors A' and B', then, are as shown. The two difference vectors A—B' and B—A' are coincident in direction and of unequal lengths. Thus the sign of the resultant of the difference vectors and, hence, of the polarity of the control voltage obtained from the discriminator network 15, will be that of the vector A—B' and the amplifier 16 will operate the relay 17 to close the contact thereof resulting in deflection of the rudder 22 in the direction to turn the torpedo toward the target.

If, as illustrated in Fig. 3B, the direction of the target signals is as indicated by the arrow S, the output voltage of the hydrophone 10A will lag behind that of the hydrophone 10B and the relation of the undelayed and delayed voltage vectors is as shown in this figure. The two difference vectors, A—B' and B—A', are coincident in direction and of the magnitudes shown. Thus, as is apparent, the polarity of the control signal supplied to the amplifier 16 for the case illustrated in Fig. 3B will be opposite to that for the case illustrated in Fig. 3A and the rudder 22 will be deflected likewise to turn the torpedo toward the target.

If the target is in such position relative to the torpedo that the signal direction is normal to the axis of alignment of the hydrophones 10A and 10B, as illustrated in Fig. 3C, there is no time lag between the outputs of the hydrophones 10A and 10B and the two difference vectors are equal. Consequently, the resultant voltage obtained at the discriminator network is zero and the torpedo remains on course toward the target.

The amplitude of the control signal, that is the differential voltage obtained from the discriminator network 15, in relation to the angle between the normal to the axis of alignment of the hydrophones and the direction of the target signal, indicated by the arrows S in Figs. 3A, 3B and 3C, is dependent upon the time delay of the signals between the two hydrophones and the time delay introduced by the networks 13A and 13B. The signal time delay obtainable in any given structure is limited, usually, by a dimension of the body, e.g., torpedo. For example, the maximum signal delay obtainable between hydrophones mounted on the head of a torpedo is limited by the diameter of the head. The network delay used, however, is variable over a fairly wide range so that the control signal amplitude-off course relation may be adjusted.

If the network delay is made equal to the maximum signal delay, the differential voltage obtained is a maximum for target signals traveling parallel to the line of alignment of the hydrophones and decreases as the off course angle decreases. When the network delay is less than the maximum signal delay, the maximum differential voltage is obtained for a smaller off course angle. For example, in an illustrative system designed for operation over the frequency range of target signals between approximately 200 and 400 cycles per second, if the maximum signal delay is $2.4 \times 10^{-4}$ seconds and the network delay is $10^{-4}$ seconds, the maximum differential voltage is produced for an off course angle of approximately 25 degrees. For smaller off course angles, the differential voltage increases substantially linearly from zero degrees off course to a maximum at about 25 degrees off course. Above 25 degrees off course, the differential voltage remains substantially constant.

It will be appreciated, then, that in the resolving network described, phase differences in the signals detected by the two hydrophones are converted into amplitude differences of voltage related in polarity and magnitude to the signal phase differences, so that the rudder, or elevator, which is controlled in accordance with the differential voltage, is deflected to guide the torpedo to the target.

The automatic volume controls 12 maintain the output level of the two amplifiers 11 substantially constant so that, as will be apparent, the differential control voltage obtained from the discriminator network is substantially independent of the absolute signal level at the hydrophones but, as has been pointed out above, is dependent upon the signal phase differential at the two hydrophones.

It will be understood, of course, that various other controls, such as rudder, or elevator, follow up, depth and trim, may be incorporated in the system illustrated in Fig. 1 to supply appropriate control voltage components associated with the differential voltage obtained from the discriminator network 15, as in the manner described in the Ronald F. Wick application identified hereinabove.

Figure 2:
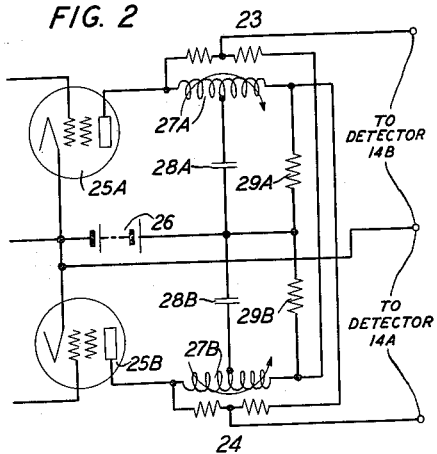
Fig. 2 is a circuit schematic of one delay network construction which may be employed in the system illustrated in Fig. 1.

A suitable delay network configuration for inclusion in the system illustrated in Fig. 1 is shown in Fig. 2. The last stages of the amplifiers 11 are shown at 25 and the plate battery at 26. Each network 13 comprises a center tapped coil 27 having a high coefficient of coupling, the mid-point of each coil having a condenser 28 connected thereto, and a terminating resistance 29. The parameters of the impedances constituting each network are correlated, in ways known in the art, so that each network has a linear phase characteristic and the two networks are substantially identical. The input side of each network is connected to the output side of the other by the respective cross-connection 23 or 24, which may be a resistance as shown, large in comparison to the terminating resistances 29. Thus, two voltages, supplied to the detectors, are obtained each being the resultant of the output voltage, undelayed, of one of the amplifiers and the output voltage, delayed, of the other amplifier. With well designed coils and condensers employed, the attenuation of the networks is small. The networks, as is apparent, are of relatively simple construction so that, as a practical matter, matching of the two networks is readily realized.

Figure 4:
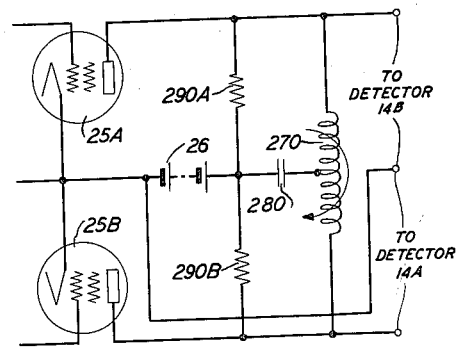
Fig. 4 is a circuit schematic illustrating another form of delay network suitable for use in signal translating systems constructed in accordance with this invention.

Another construction wherein a single delay network is provided for the two channels is illustrated in Fig. 4 and comprises a center tapped coil 270 having a high coefficient of coupling and connected between the anodes of the output stage tubes 25. Equal resistors 290 are connected to these anodes as shown and the common terminal thereof is connected to the mid-point of the coil 270 by way of the condenser 280. The impedance constants involved are correlated so that the network has a linear phase characteristic.

Although specific embodiments of the invention have been shown and described, it will be understood that they are but illustrative and that various modifications may be made therein without departing from the scope and spirit of this invention as defined in the appended claims.

What is claimed is:

1. A signal-controlled steering system for a moving body having a rudder, actuating means for said rudder and control means for said actuating means, said system comprising a pair of signal translating devices mounted in spaced relation and effective to convert signals received thereat into output voltages, means for deriving from each of said devices a voltage proportional to the output voltage thereof and delayed a preassigned time with respect thereto, means for combining the output voltage of each of said devices with the derived voltage corresponding to the output voltage of the other device, means for rectifying the two combined voltages, means for combining the rectified voltages in difference relation, and means for supplying the resulting difference voltage to said control means.

2. A signal-controlled steering system for a torpedo having a rudder, means for deflecting said rudder in opposite directions and control means for said deflecting means effective to produce deflection of said rudder in one direction or the other in accordance with the polarity of a signal supplied to said control means, said system comprising a pair of similar hydrophones mounted in spaced relation, a pair of substantially identical delay networks each coupled to a corresponding one of said hydrophones, means for combining the output voltage of each hydrophone with the output voltage of the delay network coupled to the other hydrophone, a pair of rectifiers each energized in accordance with a corresponding one of the combined voltages, means for combining the outputs of said rectifiers, and means for supplying the resultant voltage to said control means.

3. A signal translating system comprising a pair of signal translating devices exposed to the same signals and effective to convert signals received thereby into corresponding voltages, a linear phase delay network including a coil having a high coefficient of coupling, connected across said devices, a pair of equal resistances connected in series across said coil and a condenser connected between the mid-point of said coil and a point between said resistances, a first detector connected between said point and one end of said coil, a second detector connected between said point and the other end of said coil, and means for combining the outputs of said detectors in difference relation.

4. A signal translating system comprising a pair of signal translating devices exposed to the same signals and effective to convert signals received thereby into corresponding signal voltages, said devices being spaced a distance comparable to at least a quarter wavelength of the signals to be translated thereby, delay network means connected to said devices for deriving therefrom two voltages each corresponding to a respective one of said signal voltages and delayed with respect thereto a fixed time substantially less than the maximum delay time between signals received at the two devices, means for combining each signal voltage with the delayed voltage corresponding to the other signal voltage thereby to produce two resultant voltages, and means for combining said resultant voltages in difference relation.

5. A signal translating system comprising a pair of signal translating devices spaced a distance of at least a quarter wavelength of the signals to be translated thereby and effective to convert signals received thereby into corresponding signal voltages, a single linear delay network means permanently connected to both said devices to produce two voltages corresponding and equally delayed with respect to the two signal voltages, means for combining each signal voltage in difference relation with the delayed voltage corresponding to the other signal voltage thereby to produce two resultant voltages, and means for combining said resultant voltages in difference relation.

6. A submarine signaling system comprising a pair of substantially identical hydrophones spaced a distance equal to at least a quarter wavelength of the signals to be translated thereby, a pair of substantially identical amplifiers provided with automatic volume control and each connected to a respective hydrophone to be energized in accordance with the output thereof, means comprising a single linear delay network permanently connected to the output sides of both said amplifiers for producing two in-phase voltages each corresponding to the resultant of the undelayed output voltage of one amplifier and the delayed output voltage of the other amplifier, and means for combining said in-phase voltages in difference relation.

References Cited in the file of this patent

UNITED STATES PATENTS

| | | |
|---|---|---|
| 1,839,290 | Bailey | Jan. 5, 1932 |
| 1,968,068 | Blancard et al. | July 31, 1934 |
| 2,166,991 | Guanella | July 25, 1939 |
| 2,208,377 | Luck | July 16, 1940 |
| 2,251,708 | Hefele | Aug. 5, 1941 |
| 2,253,975 | Guanella | Aug. 26, 1941 |
| 2,262,931 | Guanella | Nov. 18, 1941 |